United States Patent [19]

Bowles et al.

[11] Patent Number: 4,525,859
[45] Date of Patent: Jun. 25, 1985

[54] PATTERN RECOGNITION SYSTEM

[76] Inventors: Romald E. Bowles, 2105 Sondra Ct., Silver Spring, Md. 20904; David E. Bowles, 6009 Jamina Downs, Columbia, Md. 21045

[21] Appl. No.: 414,586

[22] Filed: Sep. 3, 1982

[51] Int. Cl.³ .............................................. G06K 9/00
[52] U.S. Cl. ......................................... 382/5; 382/27; 382/54
[58] Field of Search ................... 382/5, 27, 51, 52, 53, 382/54, 4; 356/71; 358/282

[56] References Cited

U.S. PATENT DOCUMENTS

| | | | |
|---|---|---|---|
| 3,665,326 | 5/1972 | Sullivan | 382/51 |
| 4,003,024 | 1/1977 | Riganati et al. | 382/54 |
| 4,078,227 | 3/1978 | Fahey et al. | 382/53 |
| 4,083,035 | 4/1978 | Riganati et al. | 382/27 |
| 4,246,568 | 1/1981 | Peterson | 382/4 |
| 4,298,895 | 11/1981 | Arai et al. | 382/51 |
| 4,429,413 | 1/1984 | Edwards | 382/4 |

Primary Examiner—Leo H. Boudreau
Assistant Examiner—Michael M. Murray
Attorney, Agent, or Firm—Larson and Taylor

[57] ABSTRACT

A pattern recognition system which detects line bifurcations and line endings, denoted minutiae, in a pattern of lines such as are found in a fingerprint is disclosed. In one embodiment, an image of a pattern is focused on a conventional matrix of image sensors or pixels. An interface circuit serially reads the voltages from the pixels and applies them to an automatic, programmable threshold detector which optimally selects a cutoff voltage and outputs a binary signal representative of the presence of a point to a minutiae detection circuit. One part of this circuit electrically reforms the matrix on a first-in-first-out basis and simultaneously forms a smaller submatrix or window. Another part of the detection circuit determines firstly if a point is present in the central array of the window, and if so, secondly whether no more than two points, which are also contiguous, are present in the peripheral part of the submatrix. In such a case, a minutia has been located and a memory stores the address of the window.

32 Claims, 11 Drawing Figures

PATTERN RECOGNITION SYSTEM

FIELD OF THE INVENTION

The present invention relates rather generally to a pattern recognition system which can optically determine and electronically process a pattern of lines so that the pattern can be electronically compared with a known pattern. More particularly, a presently preferred embodiment of the invention relates to a personal identification system which uses the fingerprint image from a person's finger for an in situ, local identification of the person for purposes of providing, for example, physical access to a space, access to a computer, access to funds, access to credit, access to records or identification of claimed identity by police. In addition, the present invention in another embodiment relates to the detection of minutiae (ridge endings and ridge bifurcations and/or valley endings and valley bifurcations).

BACKGROUND OF THE INVENTION

The problem of either ascertaining the identity of an individual or ascertaining whether an individual is the person he or she says, is a common one faced every day by industry, businesses, and government. There are three accepted fundamental ways that a person's identity may be established: (1) something the person knows; (2) something the person has; or (3) something the person is. Category (1) includes such items as passwords, knowledge of the combination of a lock, or knowledge of a series of facts from the individual's personal background. Category (2) includes identification cards, passes, badges, and keys to locks. Category (3) includes physical characteristics of the individual such as fingerprints, hand geometry, voice characteristics, physical appearance, and physical deformities such as scars and the like. An evaluation of the three fundamental ways quickly directs the practical, real-time applications when user acceptance, practicality, and liability are considered, to digital minutiae correlation of fingerprints.

Fingerprints have been found to be unique to the individual and therefore provide an extremely reliable identification characteristic, have been found to be extremely practical to be used for identification and, if not recorded, are generally not objectionable as a means for identification by either the individual to be identified or the organization using the system. Conventional systems which have attempted to use fingerprints for such identification are as diverse as that disclosed in the Nielsen U.S. Pat. No. 2,936,607 (for operating a lock mechanism), to that disclosed in the Williams et al U.S. Pat. No. 3,201,961 (operating a door mechanism), to that disclosed in the Ernst U.S. Pat. No. 3,576,537 and the Miller and Miller et al U.S. Pat. Nos. 3,576,538 and 3,584,958 (for comparing an individual's fingerprint with a representation thereof on a record such as an identification card), and finally to that such as disclosed in the McMahon U.S. Pat. No. 3,975,711 (comparison of the fingerprint pattern on an individual's finger with a representation of the fingerprint electronically stored in a computer), all of said patents being incorporated herein by reference.

Because of the tremendous advances in the computer industry, there are numerous conventional systems presently available or disclosed in the prior art which permit a real-time identification of a fingerprint pattern. For example, the Federal Bureau of Investigation uses an automatic fingerprint identification system entitled "FINDER". This system was developed with background support done by the National Bureau of Standards and with contracts with the Calspan Corporation and North American Rockwell Corporation. The FINDER system utilizes an optical scan reader which scans a fingerprint ink image and develops an analog signal dependent upon the reflectivity of the ink image as the scan dot proceeds in the scan. The information is analyzed by a programmed computer to enhance the image electronically by eliminating gray areas and develop a digitized black and white image of the fingerprint in the computer memory. The programmed computer also fills in gaps in the ridges which are less than a prescribed length and eliminates spots in the valleys which are shorter than a prescribed length. A 16 by 16 increment square window scans the fingerprint, an increment being a tenth of a millimeter. Thus, the window advances through the fingerprint in increments of a tenth of a millimeter and looks for ridges which enter the square window, but do not exit it. When such a ridge is identified, its coordinate location is stored in the computer memory and the ridge is also analyzed to establish an angle, theta, of the ridge at the termination. The data is then converted so that the black ridges and white valleys are reversed as to color and the data is rescanned to look for terminations of valleys (which are ridge bifurcations). The additional coordinates and angles for each of the inverted ending points are also stored.

The FINDER system uses an analysis technique which considers the coordinates and angle values of the minutiae and compares them against other coordinates and angle values of stored fingerprints. The analysis technique was developed by the National Bureau of Standards and is explained and described in National Bureau of Standards NBS Technical Notes 538 (issued August, 1970), 730 (issued June, 1972), and 878 (issued July, 1975), incorporated herein by reference. However, the FBI FINDER system is very elaborate and is aimed at storing extremely huge numbers of fingerprint data. The FINDER system is more complex than that needed when the object is merely to compare an individual's fingerprint with that of the person he claims to be. In addition to being very elaborate, the FINDER system is extremely expensive, costing well over a million dollars.

The commercially available Calspan system is called "FINGERSCAN", and is an automatic fingerprint recognition system for access control and identification. This system combines a number identification system with a fingerprint reader and scans the person's fingerprint, comparing the scanned image minutiae pattern with a stored pattern identified by the number. An associated computer digitizes the information, enhances the image and develops the minutiae location using a method similar to the FINDER system. This system uses extremely complex equipment and therefore is also rather expensive, a terminal station reported as selling for approximately $20,000 with an additional charge for the remote computer.

Other, less costly approaches, such as that marketed by KMS Industries Inc. reportedly do not have the high reliability of those techniques which use minutiae. The KMS system makes a laser scan of a fingerprint to develop a hologram and compares the developed hologram with a previously stored image or one mounted on an identification card. The problems of a holograph type system and the operation of such a system are disclosed in numerous U.S. patents such as those of Caulfield et al U.S. Pat. No. 3,716,301 and Malloney U.S. Pat. No. 3,743,421.

It appears that the major difficulties and disadvantages of the FINGERSCAN and FINDER systems and other systems disclosed in the prior art is the cost of hardware and real time required to reliably enhance and examine the fingerprint image and establish the minutiae locations given the low quality level of the fingerprint image with which they must work. Furthermore; in those systems which use latent prints, while the distances between the ridges of a fingerprint averages 0.4 millimeters, they can vary by a factor of 2 for any individual finger depending on skin displacement when the finger contacts the hard surface normally encountered to establish a print which will be examined. Such a variation imposes extreme problems for a lowcost minutiae reader. Another factor in the prior art systems is the cost and time required for data processing, the FINDER system requiring large, general purpose digital computers.

Another apparent reason for the complexity of the prior art systems, and hence the amount of their cost and real time required to process an image, is that the location of the minutiae is defined not only by Cartesion Coordinates, but also by the angle of the ridge or valley producing the minutiae. For example, the Bodez U.S. Pat. No. 3,582,889, discloses a serial, first-in first-out processing of video signals which, however, must be interrupted so that the singular point detector can cycle a predetermined number of data points in a "window matrix" of the larger matrix. This system's approach not only requires a delay in processing the information, but also has an added circuit complexity. These deficiencies are also seen in the system disclosed in the Bourne U.S. Pat. No. 3,292,149. Both Bodez and Bourne patents are incorporated herein by reference.

However, it is believed that the major difficulty with all of the prior art devices is their inability to obtain a high quality, undistorted, reproducible fingerprint image. The quality of fingerprint images vary greatly in contrast and clarity. Furthermore, the widths of the ridges and of the valleys of different impressions of different fingerprints vary widely when such impressions are made on an unyielding surface or upon one which imposes shear loading on the finger during the impression act. This is particularly so when the shear loading varies during the impression act. Almost all of the prior art systems disclose the taking of a "live print" of a finger when the finger of the individual directly contacts the viewing window or prism. With this method, because the valleys of the fingerprint do not touch the glass and the ridges do contact the glass, the fingerprint is observable as a result of the different indicies of refraction of the contacted and non-contacted portions of the window. Surface contamination of the window results from repeated use and degrades the image quality. Finger pressure is uneven from point to point in the fingerprint area and results in "gray" areas in the image. Variation in shear forces as the finger is brought into contact with the window stretches portions of the fingerprint area and compresses other areas in a non-isotropic fashion causing significant distortion of the resulting image. As mentioned above, the prior art systems do not attempt to overcome this inadequacy by providing a higher quality print, but by utilizing expensive, real time computers and computer programs to reconstruct and enhance the fingerprint image.

SUMMARY OF THE INVENTION

The present invention provides methods and apparatuses for overcoming the foregoing disadvantages of the prior art devices. In particular, the present invention provides significant advantages in the area of personal identity validation which is aimed at the confirmation of a claimed identity such as those systems which are supervised by an attendant who performs actions based on the validity of a person's claimed identity.

In a particular embodiment of the present invention in use as a personal identity validation system, an individual identifies himself by providing a previously distributed identification number and having this number used by the system to select a previously stored minutiae location pattern corresponding to the fingerprint of the individual's forefinger. The individual then places his or her forfinger on a designated area of an image enhancer and the image of the fingerprint of the forefinger is automatically scanned for locations at which ridgesand/or valleys terminate, the locations being denoted minutiae locations. The pattern of minutiae locations thus obtained are then automatically compared with the pattern of minutiae locations of the claimed identity.

The system of the present invention in one embodiment thereof uses an optical system for scanning an image and outputting an electrical representation thereof in a predetermined matrix format, electronic means for receiving the "electrical" image from the optical system and for determining the locations of the minutiae, and electronic means for automatically comparing the determined minutiae locations with previously stored minutiae locations of the claimed individual's corresponding fingerprint.

The electronic data processing embodiment of the present invention can receive the digitized fingerprint image matrix from the optical system components on a first-in, first-out basis which thereby permits rapid, real-time analysis of the fingerprint image as quickly as the information is conveyed from the optical system components. In addition to providing a rapid and accurate identification of minutiae, the electronic data processing system can also include an automatically variable threshold detection system to convert the spectrum of analog electronic signals representative of the video matrix into a matrix of binary points. In this way, the present invention can automatically compensate for different density images and can maximize the clarity of the electronically stored image. A further aspect of one embodiment of the present invention is an electronic data processing system with the capability of filling in a missing point of a read fingerprint image so that false minutiae, for example, due to cuts and other temporary damage of the fingerprint can be minimized and extracted from the data prior to comparison of the read fingerprint image with the previously stored minutiae location pattern.

According to one embodiment, the present invention is directed to a system for identifying a pattern of lines in which some of the lines terminate and some of the lines become bifurcated. This system comprises a video means for producing a plurality of electrical signals which correspond to a plurality of points on the pattern and a first storage means for storing the signals on a first-in, first-out, basis and for forming a large matrix of the signals. A second storage means connected to the first storage means progressively stores a selected number of signals at a time on a first-in, first-out basis and also forms a plurality of successive window matrixes, where each window matrix is a submatrix of the large matrix, such that each of the signals is eventually stored in at least one window matrix.

The window matrix has M lines by N columns of storage cells and includes a peripheral set of $2(M-2)+2N$ storage cells for storing a peripheral set of signals and a central set of storage cells for storing a central set of signals. First, second and third determining means determine, respectively, whether a first preselected number of the stored central set of signals have a first predetermined value, second whether no more than a second, preselected number of the stored, peripheral set of signals have a second predetermined value, and third, the location of the window matrix upon affirmative determination by the first and second determining means, the third means also including a storage means for storing the location information.

Other features and advantages of the present invention will be discussed in or apparent from the description of the preferred embodiments of the invention found hereinbelow.

BRIEF DESCRIPTION OF THE DRAWINGS

FIG. 8a is a representation of a window matrix wherein each of the blocks of the matrix are given an address; and FIG. 8b is a table with exemplary information stored in each of the matrix blocks of FIG. 8a and is a diagrammatic representation of how an address location can be generated based on the information stored in the window matrix.

DESCRIPTION OF THE PREFERRED EMBODIMENTS

Figure 1:
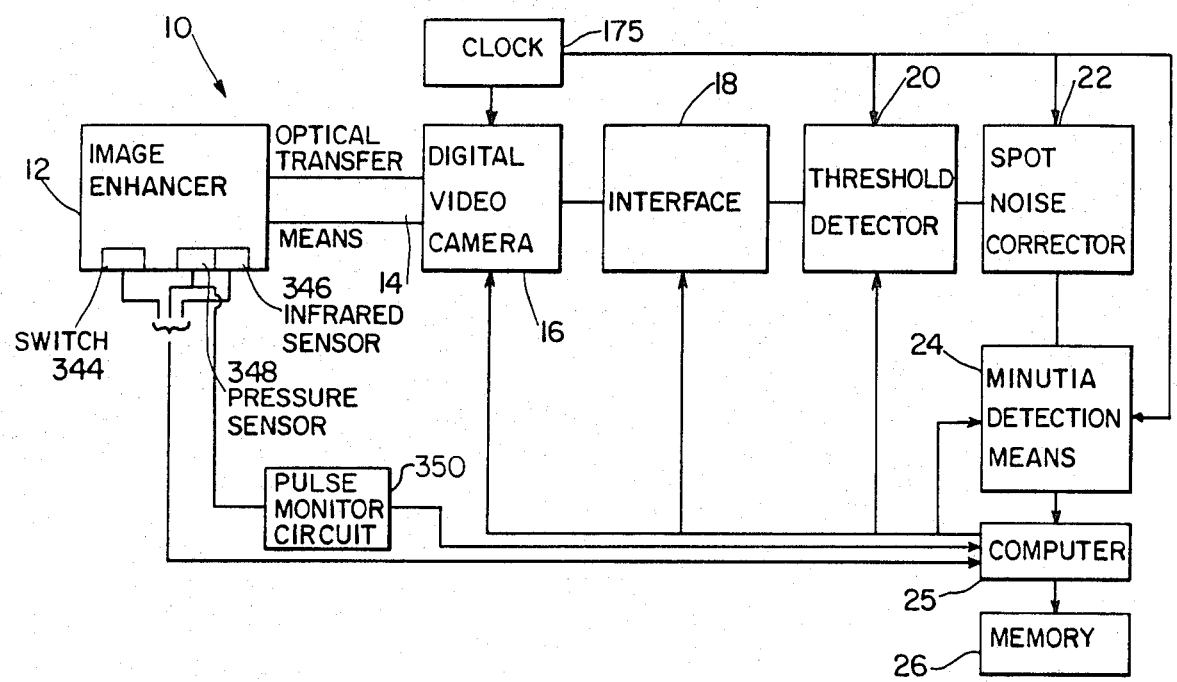
FIG. 1 is a schematic block diagram depicting the various components of one embodiment of an identification system according to the present invention.

With reference now to the figures wherein like numerals represent like elements throughout the several views, a pattern recognition system according to the present invention is depicted in several embodiments. A block diagram of a pattern recognition system 10 is depicted in FIG. 1. The system includes an image enhancer 12 for producing a negative image of a pattern such as the ridges and valleys or raised and lowered portions that define the fingerprint of an individual. The produced image is a negative one in the sense that image enhancer 12 produces a light or white line for a fingerprint ridge and a dark or black line for a fingerprint valley, i.e. the reverse of the pattern created when a finger is inked and pressed against a piece of paper. Image enhancer 12 is optically coupled by an optical transfer means 14 to an image recording means or an image detecting means. One example of an image recording means is a conventional film camera and one example of an image detecting means is a conventional video camera denoted 16, that has image sensitive areas. Optical transfer means 14 transfers the formed image from image enhancer 10 to the image sensitive areas of video camera 16. Camera 16 is preferably a solid state automatic camera, such as General Electric Model TN2200 and TN2201, which is comprised of a plurality of pixels arranged in a matrix format (such as $100 \times 100$ or $128 \times 128$). The output of camera 16 is fed to an electronic interface 18 which provides analog and digitized video signals representative of the video image to a novel threshold detector 20. Threshold detector 20 compares the received analog or digitized video signal from each pixel with a determinable and automatically variable threshold level and produces either a high level signal (e.g., a "1") or a low level signal (e.g., a "0"), depending upon whether the pixel signal is greater than or less than the threshold level, respectively. A spot noise corrector 22 receives the signals from threshold detector 20 and compares a given signal with neighboring signals in the matrix and determines whether the compared signal is a correct one or is incorrect, perhaps as a result of a cut or of noise. If the signal is incorrect, the correct signal is automatically provided. Finally, the corrected signal from spot noise corrector 22 is sent to a minutiae detection means 24 for determining whether there is a minutia at the location of the pixel and if so the address of the pixel is transmitted to a computer 25 and stored in a memory means 26. Computer 25 also receives image pattern ready and verification signals from image enhancer 12 and then activates the other components of system 10 in response thereto. The general components of pattern recognition system 10 will now be explained in greater detail.

Figure 2:
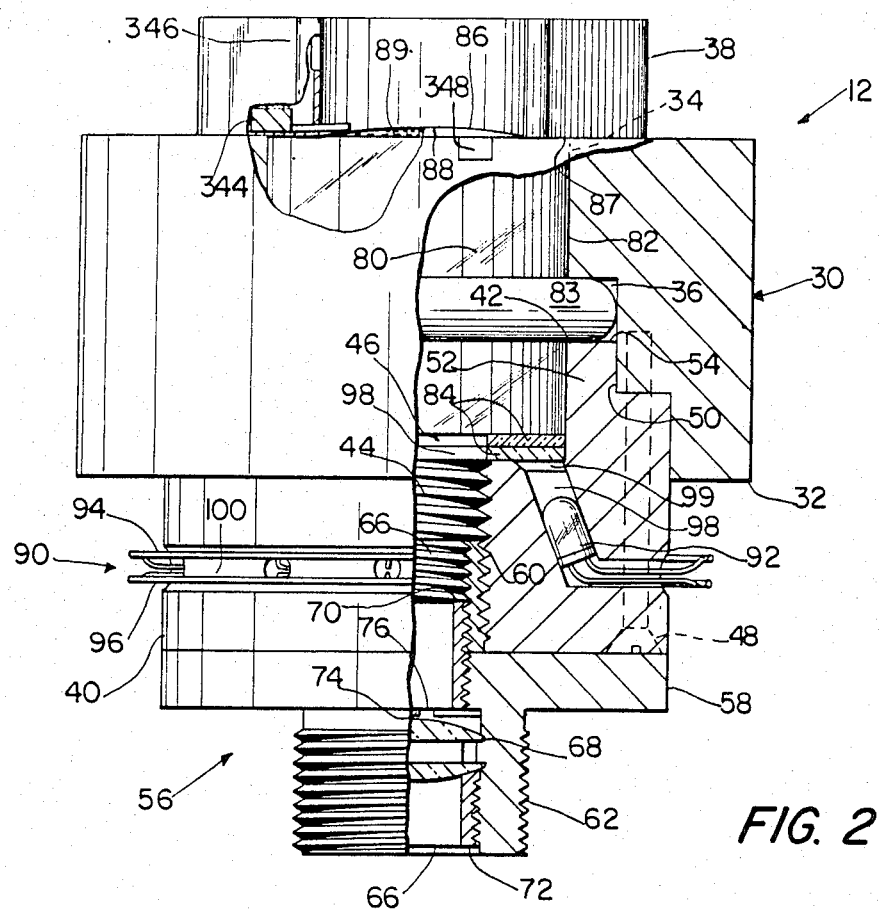
FIG. 2 is a side elevational view, partly in cross-section, of one embodiment of an image enhancer according to the present invention.
Figure 3:
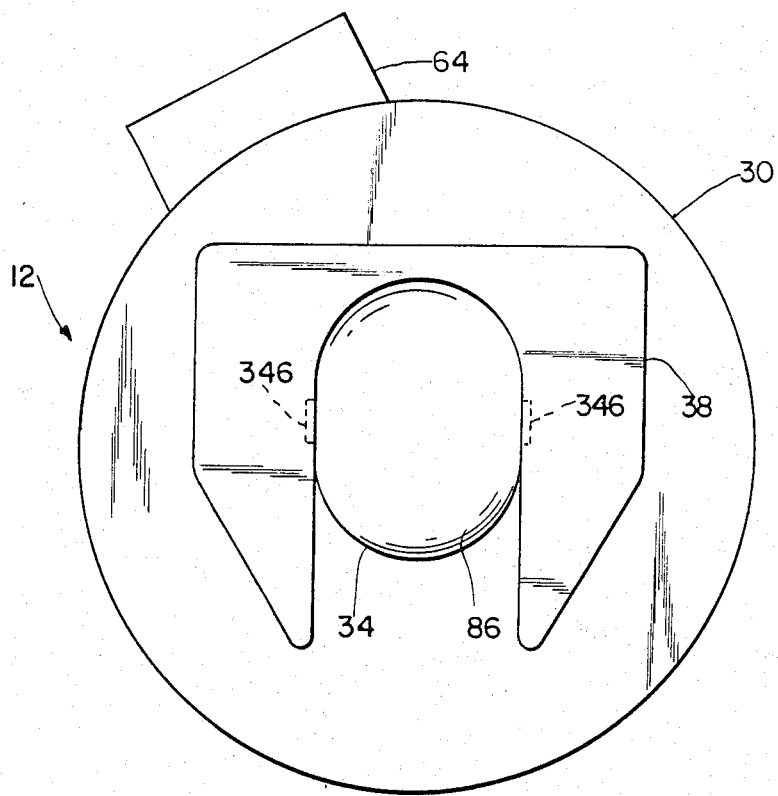
FIG. 3 is a top plan view of the image enhancer shown in FIG. 2.

An image enhancer 12 according to the present invention is depicted in FIGS. 2 & 3, and can be made from brass or other suitable rigid, strong material. Image enhancer 12 is comprised of a main, annular body portion 30 having a depending axial flange 32 that respectively define a main central bore 34 and an enlarged lower bore portion 36 therein; a central guide 38 mounted on the top of body portion 30 and preferably integral therewith; and a lower, annular cap portion 40. Cap portion 40 has a large upper bore 42 in communication with a threaded lower bore 44 therein and has an annular rim 46 at the junction of bores 42 and 44. Cap portion 40 is telescopically and rigidly mounted inside enlarged lower portion 36 of bore 34 with mounting means such as countersunk screws 48. Flange 32 of body portion 30 has an inner annular ring section 50 integral therewith such that the inner surface of body portion 30 has a stepped configuration. Cap portion 40 has an upstanding annular boss 52 integral therewith and inwardly spaced from the outer edge thereof such that cap portion 40 closely conforms to the stepped configuration of lower bore portion 36. However, the axial length of boss 52 is less than that of ring section 50 so that an annular groove 54 is produced when cap portion 40 has been assembled inside body portion 30.

Image enhancer 12 is further comprised of a lens retainer 56. Lens retainer 56 is comprised of a top plate 58, an upper projecting, externally threaded, annular boss 60, and a downwardly depending, externally threaded, annular boss 62 for mounting video camera 16. An uowardly- projecting arm 64 attached at the periphery of top plate 58 and integral therewith can be used to assemble upper boss 60 of lens retainer 56 into threaded bore 44 of cap portion 40 and further serves as a mounting boss for the entire assembly. A threaded central bore 66 extends completely through lens retainer 56 and a lens 68 is mounted therein by upper and lower cylindrical retainers 70 and 72. An aperture stop 74 is mounted to the bottom cf upper cylinder retainer 70 for restricting the amount of light received by lens 68 and is comprised, for example, of a black opaque flexible sheet having a centrally located orifice 76 of a fixed size therein.

Mounted in bore 34 is a cylindrical glass window 80 which preferably has a diameter slightly smaller than the diameter of bore 34 that is selected so as to allow room for the side skirt 82 of a flexible membrane 86 yet forms a close fit therein. The excess flexible membrane skirt is rolled up to form an O-ring 83 located in annular groove 54. Protecting the bottom of window 80 and serving as shims and light diffusors are two translucent, annular plastic washers 84 which have the same diameter as that of window 80. Membrane 86 is stretched to enclose the upper end of window 80, and is an elastomeric, thin, substantially white reflective membrane that can be made from a natural or artificial rubberlike material. Membrane 86 is compressed between the end of glass window 80 and the annular, flat end surface 86 of bore 34 forming a sealed trapped volume 88 between membrane 86 and the end of glass window 80.

In one embodiment of the present invention, a plain end, non-lubricated condom manufactured by Schmid Laboratories, Inc. and sold under the trademark of "SHEIK" was successfully used as membrane 86. In that embodiment, O-ring 83 was simply the rolled end of the condom. This condom has a thickness of 0.12 mm. In any event, membrane 86 must have properties such that it can readily conform to the ridges and valleys in a human finger.

A viscous, opaque medium 89, such as a dense liquid or paste fills trapped volume 88 between the flat top of window 80 and membrane 86. The properties of opaque medium 89 filling trapped volume 88 are very critical and must be properly selected so that the medium is opaque at very small thicknesses (e.g., less than the depth of the valleys in a fingerprint), has a viscosity such that the medium can readily fill any valleys in membrane 86, and can be readily displaced by any ridges in membrane 86 (e.g., the valleys and ridges formed by membrane 86 conforming to the valleys and ridges of a fingerprint pressing membrane 86 against window 80) and such that the shear forces on the finger during the image forming act are sufficiently low to eliminate significant distortion of the fingerprint. On the other hand, the viscosity of the opaque medium must also be large enough such that the blood pulsating in the finger and the continued application pressure of a finger against membrane 86 does not squeeze out that volume of the medium 89 which has filled the valleys in a conforming membrane 86. A medium 89 having these properties was obtained by mixing a bead of "HYPLAR" Mars Black Acrylic Polymer (manufactured by M. Grumbacher, Inc. of New York) Catalog No. H134-11, which is one inch long and 3/10 of an inch diameter(i.e., approximately 1.16 ml.) with 30 ml. of Black India Drawing Ink manufactured by M. Grumbacher, Inc., Catalog No. KK1455-1. The mixture of the Mars Black and India Ink has a viscosity of approximately 1.43 centipoise at 18 degrees C. Tests were conducted on the opacity of the best fluid mixture described above and fluids that transmitted too much light (the India Ink alone) and fluids which did not transmit enough light (the desired mixture plus an additional equal amount of Mars Black). The light transmission is dependent upon light wavelength. Tests were conducted using a Cary Model #16 absorption spectrophotometer and a micrometer feed cell having a variable path length. The path length(fluid thickness measured in the direction of light travel) was adjusted to 0.013 mm. The following table presents the percentage light transmitted at five wave lengths for the three fluids identified above.

| WAVE LENGTH MILLIMICRONS | TOO MUCH TRANS- MISSION | BEST TRANS- MISSION | TOO LITTLE TRANS- MISSION |
| --- | --- | --- | --- |
| 650 | 2.78% | 1.59% | .28% |
| 600 | 2.17% | 1.08% | .15% |
| 550 | 1.41% | .56% | .02% |
| 500 | 1.03% | .32% | .00% |
| 450 | .56% | .10% | .00% |

The optical system of enhancer 12 is comprised of glass window 80, aperture stop 74, lens 68, and an artificial lighting means 90 for illuminating an image formed on the top of window 80 in opaque medium 89 in trapped volume 88 by membrane 86 when conforming to the fingerprint of a finger pressing against membrane 86.

Glass window 80 is preferably of a polished glass having optically flat ends. An exemplary window 80 which has been successfully used is made of borosilicate glass that had a diameter of 1.401 inches and was 1.262 inches in length. Aperture stop 74 as mentioned above can merely be comprised of a concave piece of black plastic material having an orifice 76 approximately 4 mm in diameter therein. Lens 68 is preferably a Hastings Triplet Lens which has a maximum field flatness as well as a minimum amount of aberrations.

Exemplary features of lens 68 are an outer diameter of 12 mm, an object focal length of 61.25 mm and an image focal length of 15.3125 mm. A lens with these dimensions had a calculated focal length "F" of 12.25 mm (where $1/F = 1/V + 1/U$; where "V" is the image distance and "U" is the object distance) and a calculated magnification "M" of 0.25 (where $M = V/U$). The particular lens used in the embodiment of the invention with which these measurements and calculations were done was a Rolyn Optics Company lens stock No. 23.0050 having a diameter of 12 mm (+or−0.25 mm) and a nominal focal length of 12.7 mm (+or−5%). On the other hand a pair of "ROLYN" standard plano-convex lens, Ser. No 10.0180 were found to give a poor performance and could not be used. By using a Hastings Triplet Lens for lens 68 and the aforedescribed glass window 80, the exemplary dimensions of image enhancer 12 are approximately 59 mm from the top of window 80 to the top of lens 68, where lens 68 has an overall length of approximately 9 mm. Although lens 68 and aperture stop 74, together with their respective mounting means have been described as part of the optical system of enhancer 12, they also can be thought of as being part of optical transfer means 14. In either case, the optical system must provide for a flat object field and focus the image in a flat image field at the plane of the image sensitive area of video camera 16 in order to minimize distortion.

Lighting means 90 is comprised of an annular ring of twelve individual miniature incandescent light bulbs 92 which are wired in parallel with wires 94 and 96. Light bulbs 92 are individually mounted in corresponding bores 98 drilled in rim 46 of cap portion 40 and having a countersunk, conical upper opening 99. An annular groove 100 in the lower section of the outer wall of cap portion 40 communicates with the lower end of bores 98 and provides a protective channel for wires 94 and 96. Bores 98 are covered at their upper ends by translucent diffusor washers 84 and angle inwardly towards the center of aligned bores 42 and 34 such that a relatively homogenous composite spot of light is generated at the upper end of window 80. With the above dimensions for window 80, it has been found that a desirable light spot can be produced if the centerline of bores 98 have an angle of approximately 70 degrees with the horizontal plane (i.e., the lower end of window 80) and conical opening 99 provides a 60 degree conical reflector, which in turn results in an aiming or target point for the center of all lights approximately one inch above the top of boss 52 of cap portion 40. This is approximately 0.05 inches above the top of window 80. Desirable characteristics of lightbulbs 92 include an illumination of 0.15 candlepowers, a diameter of 3.175 mm. an MOL of 7.62 mm, and a relatively long lifetime. Such a bulb is provided by Model CM715 manufactured by Chicago Miniature Lamps and meets MIL SPEC MIL-L63630. Each light bulb has a rated lifetime of 40,000 hours and is powered with 5.0 VDC at 0.115 amperes.

The aforedescribed lighting means provides an acceptably uniform illumination through window 80. Glare and shadow distortion is further reduced by the lamp shade light diffusing effect of translucent diffusor washers 84 and can be still further reduced by coating or roughing the cylinder walls of window 80.

Figure 4:
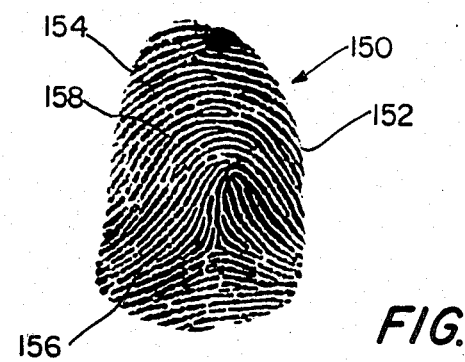
FIG. 4 is a reproduction of an actual photograph taken of a fingerprint image that has been enhanced by an image enhancer according to the present invention.

A photograph of a fingerprint image 150 from an image enhancer such as image enhancer 12 is reproduced in FIG. 4 and is comprised of white or light gray lines 152 and black lines 154. The white or light gray lines 152 represent the ridges of the fingerprint and result when the fingerprint ridges press down on top of membrane 86 (FIG. 2) thereby forcing membrane 86 against the top of window 80 and pressing out opaque medium 89. The white or light gray color is the color of membrane 86. Conversely, the black lines represent the valleys of the fingerprint and result when the opaque medium 89 fills the area between the ridges formed in membrane 86 when conforming to the fingerprint ridges. As mentioned above, the unique pattern of indicia in a fingerprint occurs at either a ridge termination or ending (i.e., termination of a white line in image 150 such as depicted at 156) or a ridge bifurcation (i.e., the point where, one white line in image 150 splits into two white lines, such as depicted at 158). It should be apparent that the converse of a ridge ending is the bifurcation of a valley and the converse of a ridge bifurcation is a valley ending. It should further be apparent that when the fingerprint image is digitized and then converted into a matrix of binary points, the matrix can be used to locate, for example, ridge endings and that the complement of the matrix can be used to locate valley endings. If a binary "1" indicated a white spot and a binary "0" indicated a black spot in the matrix then a white line ending would be indicated when a line of "1's" in the matrix terminated and the terminal point was surrounded by "0's". The means for making this determination is described hereinbelow.

The clarity of the electronic image of the fingerprint is also determined by the design criteria of the optical system and of the pixels. If the width of one ridge and an adjacent valley of a fingerprint image is denoted a cycle, it is desirable to have between 3 and 4 pixels per cycle. In this way, there are approximately two pixels per ridge width and approximately two pixels per valley width. If there are a fewer number of pixels per cycle, then it is possible that a minutia will be missed, and if there are a greater number of pixels per cycle, then the four-by-four electronic matrix in minutiae detection means 24 may not detect the presence of a minutia. Although a larger electronic matrix could be used, this would add to the complexity and cost of the minutiae detection means and related addressing and storage electronics. The size of the fingerprint image at the plane of the pixels is determined by the optical system criteria of image enhancer 10 and optical transfer means 14 as well as by the size of the ridges and valleys of the fingerprint. Some of these criteria include the magnification, object focal length and image focal length of optical transfer means 14 which includes lens 68, the size and field of vision of each pixel, and the amount of optical distortion. Optical distortion can be caused by shadows, window 80, lens 68 and improper illumination.

The selected components and exemplary dimensions of image enhancer 12 and optical transfer means 14 described above produced a clean, sharp, high contrast, consistently reproducable fingerprint image. FIG. 4 is an example of the image produced by the image enhancer and illumination system described above and photographed using a 35 mm Nikon F single lens reflex camera loaded with slide film. In tests of repeatability of the image enhancer 12 a subject unaquainted with the system was asked to place his forefinger against the enhancer and state when a photograph should be taken. The photograph was then taken without being viewed through the view finder and the individual removed his forefinger. The process was repeated for a total of 36 photographs. The slides were developed and one was selected at random to be projected through a green filter onto a screen. A second projector with a red filter was used to sequentially project the remaining other 35 slides on the same screen. The projectors were adjusted one time for scale matching and for each slide the second projector was translated and rqtated so that the two fingerprint images were superimposed to provide a yellowish and dark composite projection on the screen. Polaroid color photographs were taken of each composite projection and evaluated. Any areas where the two slides differed showed as red or green areas on the screen and composite photographs. In every case, the match was almost perfect. Only on the edges of the fingerprint images where finger angle had caused different areas of the finger to contact the enhancer were there red or green regions. On some slides one or two very small spots would show red or green to indicate a mismatch in that very small location. In the remaining slides there were no mismatch areas other than along the periphery. The quality of the fingerprint image was demonstrated as to absence of physical distortion and almost complete reproducibility of every portion of the fingerprint. The quality was judged better than most textbook examples of perfect prints.

Referring again to FIG. 1, electronic interface 18 is conventional and is commercially available. If, as mentioned above, camera 16 is a General Electric Model TN 2200, then a General Electric Automation Interface PN 2110A can be used. Interface 18, either using an internal clock or an external clock 175, individually addresses and reads each pixel in the matrix, outputs an analog or digitized video signal representative of the amount of light incident on that pixel, and then automatically addresses and reads the next pixel in the matrix.

With the aforementioned Interface PN 2110A, it is also possible to produce a predetermined voltage reference threshold level and to compare each pixel voltage level with the threshold level. Thus, Interface PN 2110A can provide a thresholded video, binary signal output based on whether the read level is greater than the threshold level or not. However, it is apparent that a supplied, predetermined threshold level cannot take into account varying conditions which would affect the quality of the video signal to interface 18, and hence the quality of the electronic matrix representation of the image. For example, because each pixel in the video matrix has a fixed, predetermined field and the ridge and valley widths of the same and of different fingerprints differ in size (due to differences in ridge direction, and due to differences in application pressure and due to differences from one person to the next, etc.), it is possible for different ridges to cover different numbers of pixels per cycle. It is clear that the number of pixels per cycle is a function of the angle at which the ridges cross the pixel line at the region where the cycle is being examined. If the magnification M is selected so that four pixels are included in one cycle on a line perpendicular to the ridge line then the number of pixels included in one cycle increases as the ridge line to pixel line angle decreases from a perpendicular of ninety degrees to a parallel condition of zero degrees. Further, the white ridge line image may not completely fill the field of view of a particular pixel which it touches. Thus, the resulting video outputs from the pixels can vary in amplitude and an automatically variable, reference threshold level may be required to produce a high quality electronic binary matrix representation of the fingerprint image.

Figure 5:
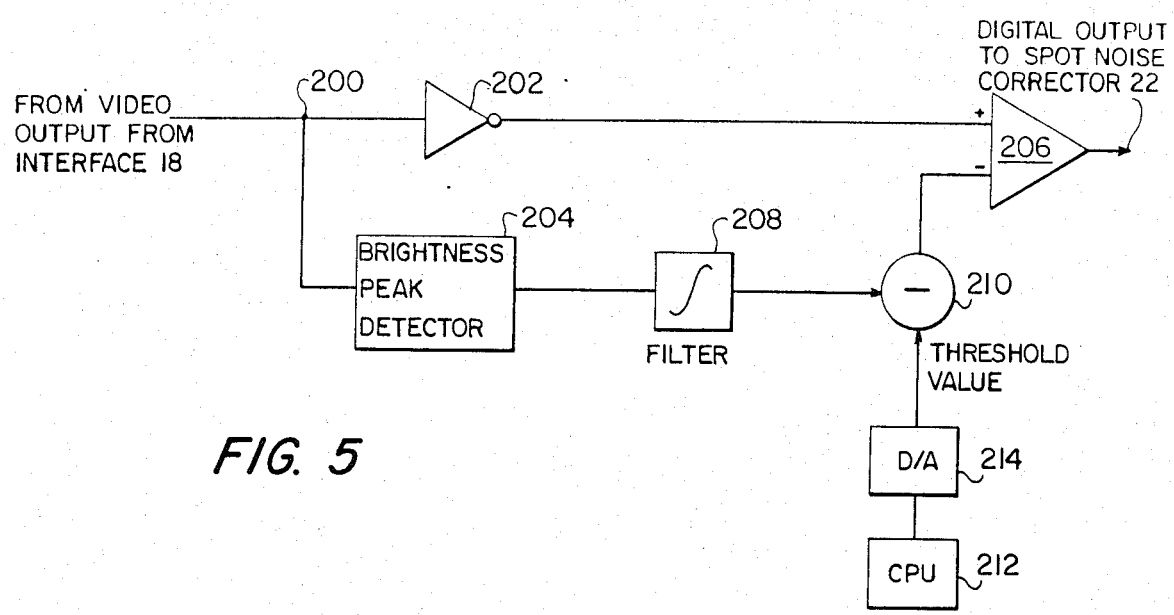
FIG. 5 is an electrical schematic block diagram of one embodiment of a threshold detector.
Figure 6:
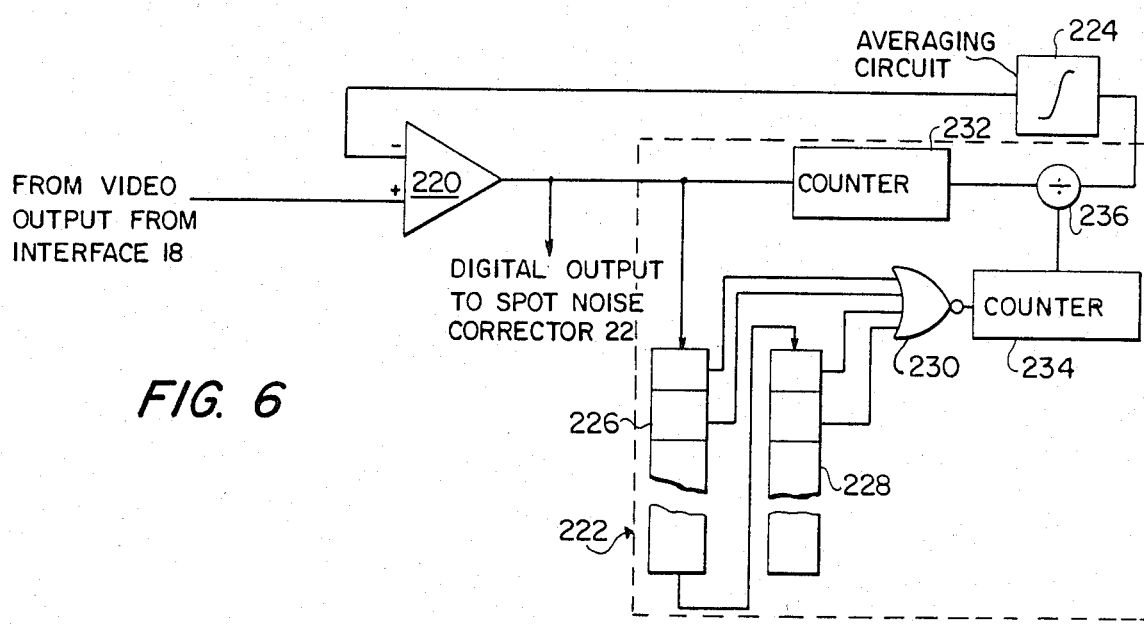
FIG. 6 is a second embodiment of a threshold detector.
Figure 7:
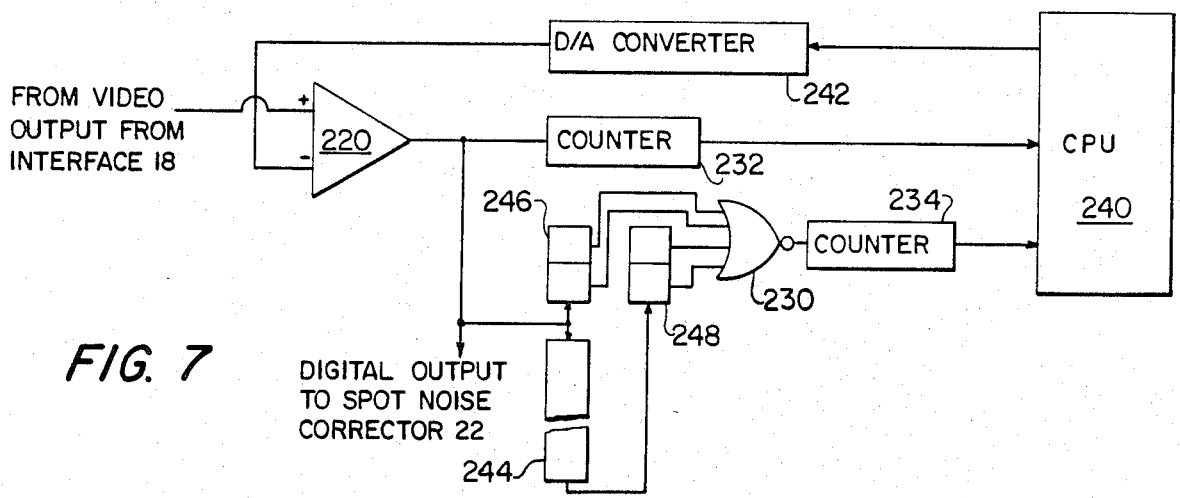
FIG. 7 is a third embodiment of a threshold detector.

Depending upon the particular type of interface 18 which has been selected or the type of output therefrom, the electrical representation of the image portion illuminating each pixel will be in either analog form (i.e., a certain voltage level) or the digital representation of the voltage level. With reference to FIGS. 5-7, there are depicted three alternative embodiments of threshold detector 20. Referring in particular to FIG. 5, a threshold detector is depicted for receiving an analog video output signal from interface 18 and converting it into a threshold binary signal. The analog signal from interface 18 is split at a junction 200 with one part being sent to the input of a conventional inverter 202 and the other part being sent to a brightness peak detector 204. From the output of inverter 202, the converted video signal is sent to the positive input of a conventional voltage comparator 206. Brightness peak detector 204 is simply a maximum voltage comparator type device that outputs the maximum input voltage. From brightness peak detector 204, the output is sent through a filter 208 to a summing junction 210, the output from which goes to the negative input of comparator 206. The second input to summing junction 210, which is set up as a subtractor, is the output from a central processing unit (CPU), or simply a digital computer 212, through a digital to analog converter 214. The output from CPU 212 is preferably chosen as a predetermined value, but one which could be updated depending upon the signal output from camera 16 as described hereinbelow. The particular threshold detector 20 depicted in FIG. 5 operates as a self-tracking density slice circuit that compares the maximum signal (i.e., the brightest signal) from camera 16 offset by a predetermined amount supplied by CPU 212 with the particular instantaneous video output signal from camera 16. This particular type of circuit in essence. looks for the range between the brightest signal and the darkest signal and arbitrarily chooses some value therebetween.

The threshold circuit depicted in FIG. 6, on the other hand, provides a continuous update to the reference level depending upon the total number of signal minutiae detected by the circuit. The analog video output signal from interface 18 is fed directly to the positive side of a voltage comparator 220, the output from which is a binary signal and which is sent to spot noise corrector 22. In addition, the output from comparator 220 is sent to a digital reference level selection circuit 222. The output from selection circuit 222 is sent through a conventional averaging circuit 224 having adjustable gain on its output to the inverting input of voltage comparator 220. Selection circuit 222 is comprised of a primary and a secondary shift register 226 and 228, respectively, a multi-input NOR gate 230 selectively connected to shift registers 226 and 228, two counters 232 and 234 respectively connected to the output of voltage comparator 220 and the output of gate 230, and a divider circuit 236 which divides the output of counter 232 by the output of counter 234 and in turn sends the quotient to the input of variable gain averaging circuit 224. Shift registers 226 and 228 each have a length equal to the length of a row or column of the pixel matrix and the serial output from shift register 226 is used as the serial input to shift register 228. For a digital camera having a pixel matrix of 128×128, it can be seen that shift registers 226 and 228 form a 2×128 matrix. A submatrix is formed by the top two states of each shift register and the information contained therein is sent by way of a parallel output to the input of gate 230. When each of the top two stages of shift registers 226 and 228 each contain a "0", the output of gate 230 will be a "1" and counter 234 will record the count. On the other hand, counter 232 counts the total number of pixels which have produced a "1" based on the previous reference level supplied by variable gain averaging circuit 224. Therefore, the output of divider 236 is simply the total number of thresholded pixels (i.e. "light" pixels representing a fingerprint ridge) divided by the total number of submatrixes of thresholded pixels which contain only "0's" (i.e., "dark" pixels representing a fingerprint valley).

The threshold detector depicted in FIG. 6 selects a threshold level which is high enough so that the total number of 2×2 matrices of dark pixels is a fixed ratio with respect to the total number of white pixels.

For example, if the selected threshold level were too high, the output from comparator 220 would be "0" for each pixel examined. On the other hand, if the selected threshold level were too low, the output from comparator 220 would be all ones which would result in a higher output from divider 236 and hence from selection circuit 222. This, in turn, would result in a higher output from variable gain averaging circuit 224 and thus a higher threshold voltage level being supplied to comparator 220 at the inverting input. If the number of 2×2 submatrices (i.e., four bits), which have all 0's (i.e., a square dark spot two pixels wide by two pixels long), were plotted against the threshold level, an "S" shaped curve would be produced. The threshold detector depicted in FIG. 6 is based on a design such that the threshold level generated after all of the pixels have been scanned at least once is located on the steeply sloped portion of the "S" shaped curve.

The threshold detector depicted in FIG. 7 operates very similarly to the operation of the embodiment depicted in FIG. 6. However, a CPU 240 has replaced divider 236 and variable gain averaging circuit 224, and these operations are performed under software control consistent with a manner well known in the art of CPU 240. In addition, a digital-to-analog converter 242 converts the output from CPU 240 to an analog signal which is then fed to the inverting input of voltage comparator 220. The other difference is that a single shift register 244 having the length of a row or column of pixels has replaced shift registers 226 and 228. The 2×2 matrix is formed by two, two stage serial in, parallel out shift registers 246 and 248, the input to shift register 246 being the same as the input to shift register 244 and the input to shift register 248 being the output from shift register 244. Finally, the output from D/A converter 242 is sent to the inverting input of comparator 220 and the video output signal is sent to the non-inverting input. The submatrix summing gate is a NOR gate denoted 230. It should be apparent that the circuit will operate almost identically to the operation of the threshold detector circuit depicted in FIG. 6.

Figure 9:
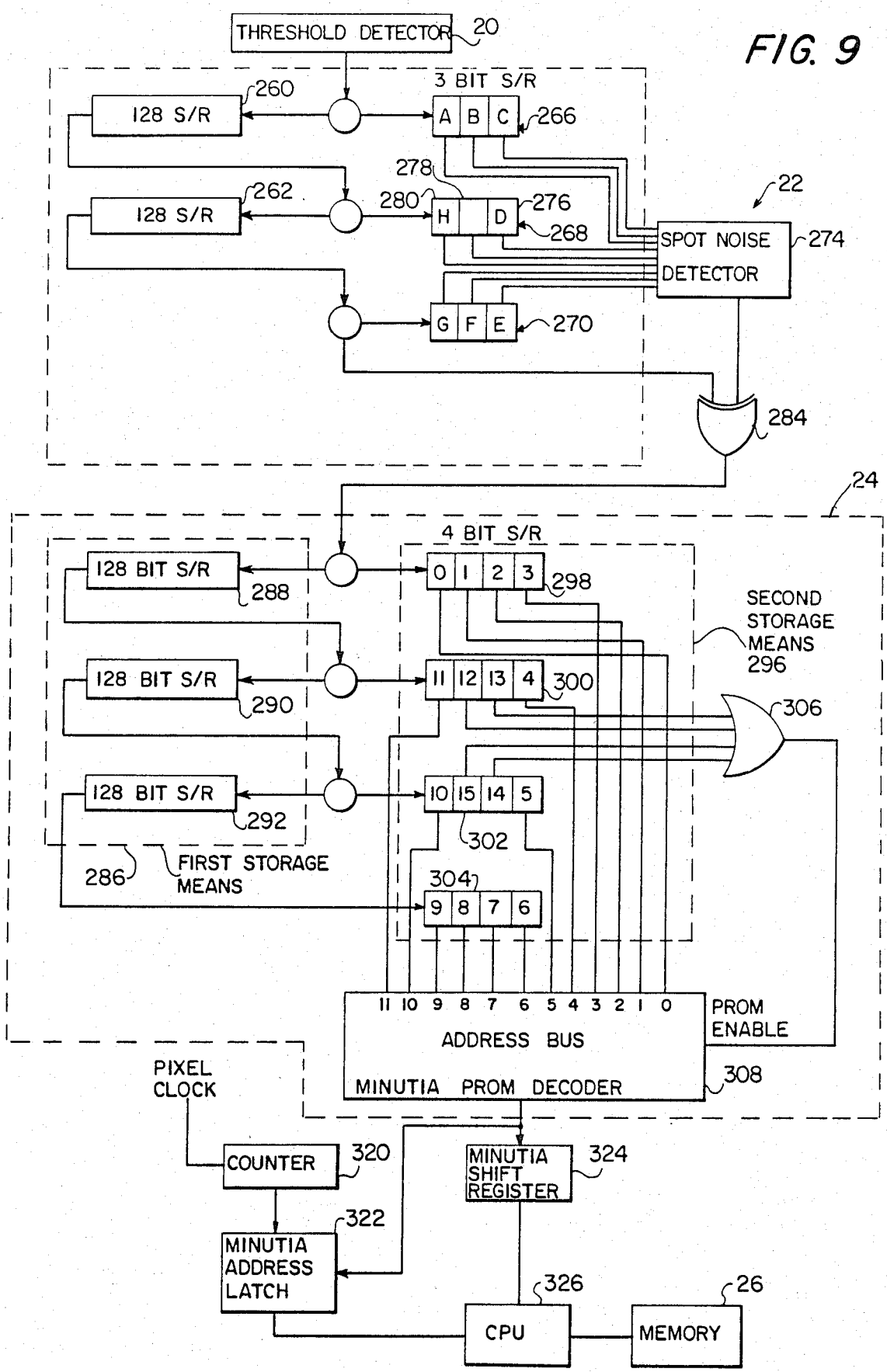
FIG. 9 is an electrical schematic of one embodiment of a circuit which provides a spot noise corrector, a minutiae detector and a memory.

With reference now to FIG. 9, one embodiment of a spot noise corrector 22, of a minutiae detection means 24, and of memory 26, is depicted. The purpose and theory of operation of spot noise corrector 22 is that in any pattern of ridges and valleys, any abnormal discontinuity is indicative of an improper signal coming from the pixel at the location of that discontinuity. There are at least two ways for detecting and correcting the discontinuity. One way is to build a submatrix of the binary bits representative of the threshold video signal in which the matrix has a size such that there is at least one central cell and a ring of peripheral cells. A spot noise is indicated whenever all of the peripheral cells have one value (e.g., a "1") and the central cell (or cells) has the other value (e.g., a "0"). It is noted that this approach to detecting the location of a spot noise is limited to a spot noise of one cell dimensions only. Nevertheless, most of the spot noise occurring are of this dimension and this type of spot noise can be easily detected and easily corrected.

The embodiment of spot noise corrector 22 depicted in FIG. 9 is of the type in which a 3×3 array is being checked for a spot noise. Obviously, spot noise in both a ridge and a valley can be detected by the same apparatus simply by inverting the input signal.

Spot noise corrector 22 as depicted in the particular embodiment of FIG. 9 comprises two time delay shift registers 260 and 262, each having a number of stages equal to the number of pixels in a row or a column and serially connected to one another, the serial input to the first time delay shift register 260 being from the output of threshold detector 20; three serial in, parallel out, three stage long matrix shift registers 266, 268 and 270 for building a 3×3 submatrix; and a spot noise detector 274. The input to matrix shift register 266 is from the output of threshold detector 20 and the inputs to matrix shift registers 268 and 270 are from the output of time delay shift registers 260 and 262, respectively. Thus, it should be apparent that the contents of shift registers 266, 268 and 270 will correspond to a 3×3 window of the thresholded binary representation of the pixel matrix. As the outputs from the pixels are read individually, line by line, the window matrix established by the matrix shift registers will be "stepped-through" the corresponding full matrix of pixel values.

In order to "build" a 3×3 matrix, the parallel output from the matrix shift registers 266, 268 and 270, respectively, is coupled to the input of spot noise detector 274. Spot noise detector 274 is comprised of conventional circuitry which examines second stage 278 of the central matrix shift register 268 to decide whether the central element of the matrix is different from all of its surrounding peripheral elements. The decisional electronics of spot noise detector 274 can simply be comprised of a logic network of gates which, for example, determine whether the two outer shift registers 266 and 270 and elements 276 and 280 of inner stage 268 are all identical (e.g., are all "1's") and whether the other element 278 of inner stage 268 is also identical. When a disparity is uncovered, a spot noise is indicated and the value is stored in the memory of spot noise detector 274 and outputted when the last stage of matrix shift register 262 has the "erroneous" value. The correct value (e.g., a "1") is then provided in place of the incorrect value. The memory part of spot noise detector 274 can simply be an array of shift registers which store and successively advance the corrected value and the replacement means can simply be an EXCLUSIVE OR gate 284. For example, spot noise detector 274 can test for all "1's" and when a "0" which should be "1" is uncovered, a "1" can simply be stored in the shift register memory of spot noise detector 274.

The output from spot noise corrector 22 is coupled to the input of minutiae detector 24. In the embodiment of the invention depicted in FIG. 9, spot noise corrector 22 and minutiae detector 24 are substantially similar. Minutiae detector 24 comprises a first storage means 286 for storing the signals from spot noise corrector 22 on a first-in, first-out basis and for forming a large "K" by "L" matrix of said signals with a plurality of serially connected shift registers 288, 290 and 292 each having the same number of stages as there are pixels in a row or column. Minutiae detector 24 further comprises a second storage means 296 connected to first storage means 286 for selectively and progressively storing a predetermined array of the signals from spot noise corrector 22 and first storage means 286. The signals are clocked in and stored on a first-in, first-out basis, thereby forming a plurality of successive window matrices. Second storage means 296 is comprised of four, four stage matrix shift registers 298, 300, 302 and 304. The inputs to matrix shift registers 300, 302 and 304 are respectively connected to the outputs of shift registers 288, 290 and 292 of first storage means 286, and the input to the first matrix shift register 298 being the same as the input to shift register 288, namely being the output from spot noise corrector 22. Each of the 16 stages of the four matrix shift registers of second storage means 296 is identified with numerals from 0 to 15 in a spiral pattern beginning with the first stage of the first matrix shift register 298. Second storage means 296 thus comprises 12 peripheral stages, namely stages 0 through 11, and four central stages, namely stages 12 through 15.

In the embodiment depicted in FIG. 9, minutiae detector 24 is designed to detect "1's". Therefore, in order to determine whether there is a 1 or a "hit" in any one of the four central stages, the parallel outputs from each of the stages are coupled to the input of a four input OR gate 306. Thus, OR gate 306 determines whether at least one of the central set of signals stored in stages 12 through 15 has the predetermined value of a "1". The output from OR gate 306 is coupled to the enable line of a programmable read only memory (PROM) 308, the plurality of address lines of which are respectively connected to the peripheral stages of the four matrix shift registers 0 through 11. PROM 308 is thus a $1 \times 4096$ permanent memory matrix. PROM 308 has stored in each of its 4096 memory locations either a 0 or a 1, the latter being stored in a particular location whenever either only one or only one set of no more than two adjacent peripheral stages have the same signal value of a 1, and thus there is a "peripheral hit". The set of all of the combinations of peripheral stages and the resulting address in hexadecimal, is listed in Table I hereinbelow.

TABLE I

| Peripheral Stages | Hexadecimal Address | Peripheral Stages | Hexadecimal Address |
|---|---|---|---|
| 0 | 1 | 5,6 | 60 |
| 1 | 2 | 7 | 80 |
| 0,1 | 3 | 6,7 | C0 |
| 2 | 4 | 8 | 100 |
| 1,2 | 6 | 7,8 | 180 |
| 3 | 8 | 9 | 200 |
| 2,3 | C | 8,9 | 300 |
| 4 | 10 | 10 | 400 |
| 3,4 | 18 | 9,10 | 600 |
| 5 | 20 | 11 | 800 |
| 4,5 | 30 | 11,0 | 801 |
| 6 | 40 | 10,11 | C00 |

A 0 is stored in each of the remaining PROM address locations. Thus, in this example where a central hit is indicated whenever there is a "1" stored in a central stage, PROM 308 is enabled and the memory location having an address determined by the contents of the peripheral stages indicates whether there is also a qualifying peripheral hit.

Minutia detector means 24 works on the principle that a minutia is indicated whenever a ridge penetrates the peripheral cells of the window matrix at only one point and terminates at any one or more of the four central cells of the window matrix. It should be apparent that the window matrix can be any size having having M lines by N lines (i.e. in this example M rows by N columns) of storage cells and thus need not even be a square matrix. However, the greater the number of central cells, the greater the complexity of the resulting hardware. It has been found (for the case where four pixels are a cycle, i.e., they cover one valley and one ridge of a fingerprint) that when $M=N=4$, a maximum number of minutiae are detected with a circuit having a minimum amount of complexity. In any case, a window matrix having M lines by N lines of storage cells has a peripheral set of $2(M-2)+2N$ storage cells and a central set of $M \times N - 2(M-2) - 2N$ storage cells. It should further be apparent that the size of PROM 308 is one bit by 2 raised to the exponent $[2(M-2)+2N]$.

The address of the window matrix when a minutia is detected is determined by a conventional counter 320, the counting input of which is connected to the pixel clock used by interface 18 to sequentially select each pixel. The count in counter 320 is coupled to the data input of a minutia address latch 322, the enabling input to which is coupled to the output of PROM 308. Thus, latch 322 is latched whenever a "1" is outputted from PROM 308 and the particular count in counter 320 is retained therein. The output from PROM 308 is also coupled to a minutia shift register 324 so that a first in, first out record can be maintained of all of the central hits. The outputs from both shift register 324 and latch 322 are coupled to a central processing unit (CPU) 326. CPU 326 is programmed to detect a valid minutia address stored in latch 322 and to output and store this address in memory 26.

The operation of minutia detection means 24 for generating an exemplary address will be explained with respect to a particular example illustrated in FIGS. 8a and 8b. FIG. 8a depicts the window matrix in which each of the cells are numbered, the peripheral cells being numbered from 0 to 11 and the central cells being numbered 12 through 15. FIG. 8b shows the address generated by the peripheral set of cells. If the cell 0 is denoted the least significant bit and the cell 11 the most significant bit, a 12 bit address is generated. If cells 8 and 9 each contain a "1" and all of the remaining cells contain a "0", then the binary coded hexadecimal address would be "300". This information is also shown in in Table I, supra. Thus, address "300" of PROM 308, which contains a "1", is accessed whenever the PROM enable line is high, and the PROM enable line is high whenever a "1" appears in any of the central cells 12, 13, 14, or 15. When enabled, PROM 308 provides the stored "1" at its output and which in turn, enables latch 322 and is stored in minutiae shift register 324. The outputs from latch 322 and shift register 324 are then made available to CPU 326, which stores the information in memory 26.

Alternate embodiments of spot noise corrector and minutia detection means 24 should be apparent to those of ordinary skill in the art. Thus, instead of having two nearly identical circuits, one each for spot noise corrector 22 and minutia detection means 24, they can be combined into one circuit in which the window from spot noise corrector 22 simply consists of a first set of four, three stage shift registers each respectively coupled to a second set of four, four stage shift registers. The parallel outputs from the first set of shift registers would be coupled to spot noise detector 274, the peripheral stages of the second set of shift registers would be coupled to PROM 308, and the central set of stages would be coupled to OR gate 306. Also, PROM 308 is essentially a decoder means and could be replaced with any other type of decoder such as an appropriately pre-programmed programable logic array (PLA). A PLA is not a memory or storage device but is a conventional device having an array of gates whose logic can be permanently programed by the user. Such a PLA can be enabled by a signal from OR gate 306 and can use as inputs the outputs from the peripheral stages of shift registers 298, 300, 302 and 304. Furthermore, it should also be evident that the functions of spot noise corrector 22 and minutia detection means 24 can be accomplished by a properly programmed digital computer. However, at the present time the depicted hardware version is believed to be much faster, more reliable, and easier to implement.

In an operational system which is being used to verify the fingerprint of a person with the stored representation of that person, the person first identifies himself or herself to the computer by entering a personal identification number or word. The computer selects the previously stored electronic record of the X, Y coordinates for minutia locations of the identified person's fingerprint and moves it to a location in active memory. The person to be identified then places his or her appropriate finger on enhancer 12 and the optical image thereof is transmitted by optical transfer means 14 to an array of pixels in camera 16. Interface 18 is activated to individually, sequentially read each of the pixels and transmit the read voltage to a threshold detector 20. Because the pixel clock in interface 18 can read the pixels as rapidly as one every 0.5 microseconds, the 16,384 pixels in a 128×128 matrix of pixels can all be read in about eighty milliseconds. Therefore, the first few scans of the pixel matrix are used to determine the particular threshold level, after which the next scan of the pixels is used to permit spot noise corrector 22 to "fill in" any incorrect thresholded binary representations of the pixels. A final scan of the pixels is then used to advance the previous scan through minutiae detection means 24 so that the addresses of the detected minutiae on a first in, first out basis are stored by the CPU in an appropriate location of memory 26.

The NBS algorithm, outlined in the three aforementioned NBS publications, incorporated hereby by reference, can then be used to compare the previously stored "electronic image" of X, Y minutiae coordinate locations with the minutiae locations identified and stored by the CPU in an appropriate location of memory 26 and converted to corresponding X, Y coordinate locations for these "observed" minutiae. This comparison provides a weighted yes/no answer to the confirmation of the fingerprint examination and that the person is who he or she has claimed.

Figure 10:
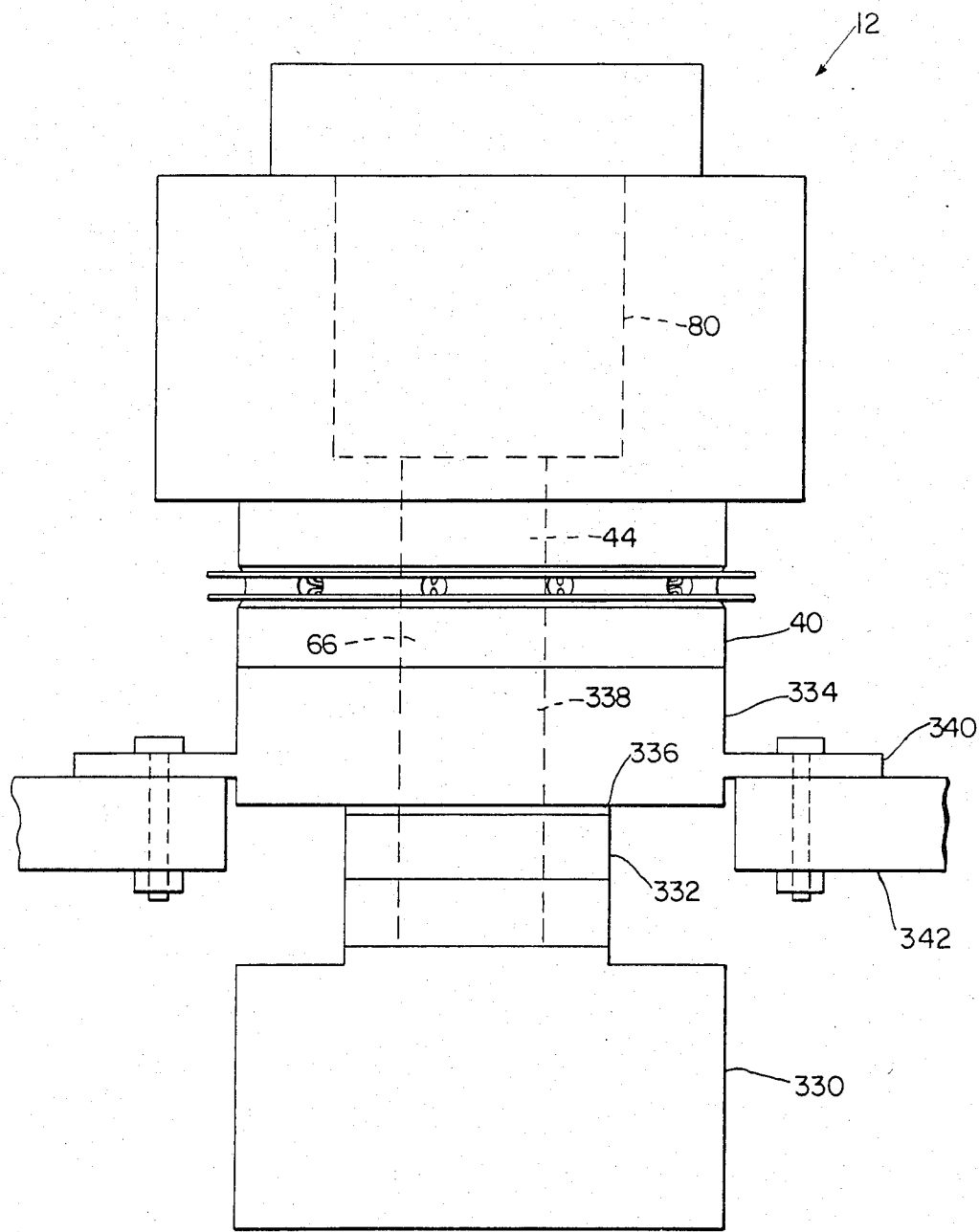
FIG. 10 is a side elevational view of a modification of the image enhancer depicted in FIG. 2 configured to mount a camera to take photographs such as that of FIG. 4.

In the foregoing example, the optical output from image enhancer 12 was coupled to video camera 16. However, an alternative embodiment is to couple the optical output to a film camera, such as camera 330 in FIG. 10. Camera 330 can be a single lens reflex camera fitted with a close-up lens, shown at 332. Camera 330 is mounted to image enhancer 12 by a coupling 334. One end of the coupling 334 is bolted to cap portion 40 of image enhancer 12 and camera 330 is screwed into a conventional photographic bayonet fitting 336 in the other end of coupling 334. Coupling 334 has a central bore 338 that is in alignment with threaded bore 44 and lens retainer central bore 66. Coupling 334 can also be provided with a mounting flange 340 for mounting the image enhancer-camera assembly on a table, such as shown at 342. Thus, with this assembly a permanent film record of a fingerprint image can easily be made.

It should also be apparent that other modifications can be made to the disclosed embodiment of the present invention which would still be encompassed by the present invention. Thus, for example, a switch 344 is incorporated into enhancer 12 such that when a person's finger is pressed down on membrane 86, the switch lever is engaged thereby indicating to the rest of pattern recognition system 10 that a fingerprint image is ready to be scanned. Switch 344 can alternatively be a pressure operated switch that is activated by the fluid pressure resulting from a finger pressing on membrane 86. Infrared heat sensors 346 can be incorporated into enhancer 12 to examine the object depressing the membrane to determine if the object is animate by determining if it has a body temperature corresponding to that of a human being under then current environmental conditions rather than being an inanimate object such as a dummy finger. Alternatively, or in addition, the liquid between membrane 86 and glass window 80 can be monitored by a pressure sensor 348 (as shown in FIGS. 1 and 2) for the presence or absence of a pulse in the finger and that pulse rate in turn can be monitored by a pulse monitor circuit 350 to evaluate the presence of excessive stress in considering identity verification by the invention. In addition, finger guide 38 can be much smaller so that the finger will be accurately located on the top of window 80. Also, through software selection, the portion of the image to be examined for minutiae locations can be selectively adjusted to ignore the pixels on the periphery of the fingerprint image. Ridges and valleys terminate at the periphery due to curvature of the finger away from the membrane.

The present invention has been described with respect to the pattern of ridges or raised portions and valleys or lowered portions that comprises a human fingerprint. However, the present invention can be used with any pattern. Further, the electronic data processing circuit was described with respect to specific circuitry. This circuitry is believed to be superior to using an equivalently functioning programmed digital computer because of speed, cost and reliability. Nevertheless, a programmed computer can still be used. Another variation would be to use a pressure sensitive grid to obtain the data points instead of the disclosed video system. Such a grid would probably find application outside the fingerprint art, such as in the printing plate or other art where the pattern is made from a rigid material.

Although the method and apparatus of the present invention have been described in detail with respect to exemplary embodiments thereof, it will be understood by those of ordinary skill in the art that variations and modifications may be effected within the scope and spirit of the invention.

We claim:

1. A system for electronically investigating a pattern that can be divided into an array of points, the system comprising:

signal producing means for producing an electrical signal for each point on a matrix of points, said matrix having "K" points by "L" points, wherein K and L are real integers with one representing the points in the matrix line and the other representing the points in a matrix column, said signal producing means providing a serial stream of signals;

selecting means for progressively selecting locatable known groups of said produced electrical signals, which groups correspond to subarrays of said points, each said subarray having M lines by N columns, including a peripheral set of $2(M-2)+2N$ points and a central set of $M \times N - 2(M-2) - 2N$ points, wherein said selecting means is comprised of a first storage means for storing and providing said electrical signals from said signal producing means on a first-in, first-out basis;

first determining means for checking and determining for each selected group of said signals whether a first, preselected number of signals corresponding to said central set of points have a first predetermined value and hence whether there is a central hit;

second determining means for checking and determining for each selected group of signals whether no more than a second, preselected number of the signals corresponding to said peripheral set of points have a second predetermined value, and hence whether there is a peripheral hit, wherein said second determining means comprises a memory means for storing $2^{2(M-2)+2N}$ coded outputs, said memory means having an enable input and $2(M-2)+2N$ address lines which are connected to said $2(M-2)+2N$ peripheral storage cells; and said first determining means comprises gate means, the inputs of which are connected to said central storage cells and the output of which is connected to said enable input, said gate means for providing an output signal to enable said memory means when said central storage cells contain said first preselected number of signals such that said memory means outputs the data stored at the memory address indicated by the signals stored in said peripheral storage cells;

third determining means responsive to said first and second determining means for determining the location of each subarray of points for which a central hit and a peripheral hit for the same group of corresponding signals were determined; and memory means for storing each determined location.

2. The system as claimed in claim 1 and further comprising a clock means for generating system synchronization clock pulses; and wherein said signal producing means successively produces a plurality of signals, each signal representative of the density of the pattern at the corresponding point and produced in response to a clock pulse; and said selecting means in response to a clock pulse selects a new group of signals.

3. The system as claimed in claim 1 wherein said first storage means is comprised of $N-1$ shift registers with each said shift register having L stages.

4. The system as claimed in claim 3 wherein said selecting means further is comprised of second storage means connected to said first storage means for selectively progressively storing and providing a predetermined number of signals and thus for forming a plurality of successive subarrays or window matrices.

5. The system as claimed in claim 4 wherein said first storage means is comprised of $N-1$ serially connected shift registers with each said shift register having "L" stages; and wherein said second storage means is comprised of N serial-in, parallel-out (SIPO) shift registers, each said SIPO shift register having M stages and the input of each of $N-1$ of said SIPO shift registers of said second storage means being connected to the output of a corresponding shift register of said first storage means.

6. The system as claimed in claim 5 wherein N equals M equals 4 and thus said second storage means is comprised of 4, four stage shift registers and thus each said window matrix having 12 peripheral storage cells and 4 central storage cells.

7. The system as claimed in claim 5 wherein the input to one of said SIPO shift registers of said second storage means is connected to said signal producing means in parallel with the input to the first one of said serially connected shift registers of said first storage means.

8. A system as claimed in claim 1 wherein said signal producing means comprises a responsive means responsive to a point on said pattern for producing an output that varies with that response, a threshold detecting means connected between said responsive means and said selecting means for making positive and negative comparisons of said responsive means output with a variable threshold and for producing a binary output signal indicative of said positive and negative comparisons, and a threshold varying means for varying said threshold.

9. A system as claimed in claim 8 wherein said responsive means produces an analog output and threshold varying means comprises a self tracking density slice circuit.

10. A system as claimed in claim 9 wherein said self tracking density slice circuit comprises a brightness peak detector that receives said responsive means output and that produces a voltage output signal, a computer for supplying a variable offset voltage signal, and a subtractor circuit for subtracting the computer generated offset signal from the peak detector output signal and for producing an output related thereto; and wherein said threshold detecting means comprises a voltage comparator for comparing said output of said subtractor circuit with the inverse of said responsive means output.

11. A system as claimed in claim 8 wherein said threshold varying means comprises a calculating means for combining the total number of said threshold detecting means positive comparisons with the number of times a predetermined array is established by said threshold detecting means negative comparisons, and for producing an output based on said combining.

12. A system as claimed in claim 11 wherein said calculating means comprises a positive counter for counting the number of said threshold detecting means positive comparisons, a negative counter for counting the number of times said predetermined array is established by said threshold detecting means negative comparisons, and a dividing and averaging means for dividing the count of said positive counter and the count of said negative counter and for averaging the results of a plurality of said divisions.

13. A system as claimed in claim 12 wherein said dividing and averaging means comprises an electronic dividing circuit and a variable gain averaging circuit.

14. A system as claimed in claim 12 wherein said dividing and averaging means comprises a programmed digital computer and a digital to analog converter.

15. A system as claimed in claim 12 wherein said calculating means comprises a first and second shift register, each having a number of stages equal to the number of points in a line in the array of points, the output of said first shift register being connected to the input of said second shift register, and comprises gate means the inputs of which are connected to a predetermined number of the initial stages of said first and second shift registers and the output of which is connected to said negative counter.

16. A system as claimed in claim 1 and further comprising a spot noise corrector means for determining the location of an incorrect value in said electrical signals produced by said signal producing means.

17. A system as claimed in claim 16 wherein said spot noise corrector means comprises a first plurality of serially connected shift registers each having a number of stages equal to the number of points in a line in the array of points, and a second plurality of serial-in parallel-out shift registers, the inputs to all but the first of which are connected to the output of a corresponding shift register in said first plurality, comprises a spot noise detector means the inputs to which are connected individual to the outputs of each stage of said shift registers in said second plurality, and comprises a correcting means for correcting an incorrect value.

18. A system as claimed in claim 17 wherein said correcting means comprises an EXCLUSIVE OR gate, the inputs to which are connected to the output of the last shift register in said first plurality and to the output of said spot noise detector.

19. A system as claimed in claim 17 wherein said first plurality is comprised of two shift registers and said second plurality is comprised of 3 three stage shift registers.

20. The system as claimed in claim 17 wherein the input to the first serial-in, parallel-out shift register of said second plurality of shift registers is connected to said signal producing means in parallel with the input to the first one of said first plurality of shift registers.

21. The system as claimed in claim 1 wherein said second determining means comprises a decoder means having an enable input connected to said first determining means and having data inputs, said decoder means for producing when enabled a signal representing the decoded data inputs.

22. The system as claimed in claim 21 wherein said decoder means comprises a read only memory.

23. The system as claimed in claim 21 wherein said decoder means comprises a logic array.

24. The system as claimed in claim 23 wherein said logic array is a programmable logic array.

25. A system for electronically investigating a finger print pattern which can be divided into an array of points and for identifying an individual based on the finger print of that individual, the system comprising signal producing means for producing electrical signals corresponding to said points, and which comprises a video camera means selecting means for progressively selecting locatable known groups of said produced electrical signals, which groups correspond to subarrays of said points, each said subarray having M lines by N columns, including a peripheral set of $2(M-2)+2N$ points and a central set of $M \times N - 2(M-2) - 2N$ points;

first determining means for checking and determining for each selected group of said signals whether a first, preselected number of the signals corresponding to said central set of points have a first predetermined value and hence whether there is a central hit;

second determining means for checking and determining for each selected group of said signals whether no more than a second, preselected number of the signals corresponding to said peripheral set of points have a second predetermined value, and hence whether there is a peripheral hit;

third determining means responsive to said first and second determining means for determining the location of each subarray of points for which a central hit and a peripheral hit for the same group of corresponding signals were determined;

memory means for storing each determined location; and an image enhancer for producing said pattern of lines from the finger print of an individual, said enhancer comprising a transparent window in optical communication with said video camera means, an elastomeric, light colored membrane and a viscous, opaque liquid interposed between said window and said membrane.

26. A system as claimed in claim 25 for identifying an individual based on the finger print of that individual, said system further comprising a finger determining means for determining the presence of a finger in engagement with said image enhancer.

27. An identification system as claimed in claim 26 wherein said finger determining means comprises a pressure transducer for detecting the pressure of said liquid, wherein a predetermined increase in liquid pressure signifies the presence of an object contacting said membrane.

28. An identification system as claimed in claim 27 wherein said finger determining means further comprises monitoring means for monitoring the changes in liquid pressure detected by said pressure transducer and comparing said changes with the expected changes resulting from a pulse in said finger, thereby indicating whether the object contacting said membrane is a human finger.

29. An identification system as claimed in claim 28 and further comprising means for determining whether the monitored pulse rate is normal for the individual being checked so to distinguish between an imposter.

30. An identification system as claimed in claim 26 wherein said finger determining means comprises a mechanical switch activated by a properly positioned finger.

31. An identification system as claimed in claim 26 wherein said finger determining means comprises a means for detecting the presence of heat emanating from said finger.

32. An identification system as claimed in claim 26 and further comprising computer means for receiving signals from said finger determining means and for activating said signal producing means, said selecting means and said first, second and third determining means upon the affirmative determination by said finger determining means of the presence of a finger.

* * * * *